(12) United States Patent
Kim et al.

(10) Patent No.: US 10,575,594 B2
(45) Date of Patent: Mar. 3, 2020

(54) FOOTWEAR INTERNAL SPACE MEASURING DEVICE AND METHOD FOR PROVIDING SERVICE THEREOF

(71) Applicant: Samsung Electronics Co., Ltd., Suwon-si, Gyeonggi-do (KR)

(72) Inventors: Joo-hyung Kim, Seoul (KR); Joong-hun Kwon, Seoul (KR); Seung-hwan Suh, Yongin-si (KR); Jin-beom Hong, Seoul (KR); Ja-woong Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 238 days.

(21) Appl. No.: 15/816,230

(22) Filed: Nov. 17, 2017

(65) Prior Publication Data

US 2018/0132568 A1  May 17, 2018

Related U.S. Application Data

(60) Provisional application No. 62/423,279, filed on Nov. 17, 2016.

(30) Foreign Application Priority Data

Feb. 15, 2017  (KR) .................... 10-2017-0020646

(51) Int. Cl.
*A43D 1/06* (2006.01)
*G01B 5/26* (2006.01)
(Continued)

(52) U.S. Cl.
CPC ............. *A43D 1/06* (2013.01); *G01B 5/0004* (2013.01); *G01B 5/26* (2013.01); *G01B 11/245* (2013.01); *G01B 11/285* (2013.01)

(58) Field of Classification Search
CPC .................................... A43D 1/06; G01B 5/02
(Continued)

(56) References Cited

U.S. PATENT DOCUMENTS 1,791,948 A * 2/1931 Bliss ........................ A43D 1/06
33/3 A
1,873,532 A * 8/1932 Bliss ........................ A43D 1/06
33/3 A
(Continued)

FOREIGN PATENT DOCUMENTS

CN     102406281 B       9/2014
DE     102005039632 A1 * 2/2007  ............... A43D 1/06
(Continued)

*Primary Examiner* — Christopher W Fulton
(74) *Attorney, Agent, or Firm* — Jefferson IP Law, LLP

(57) ABSTRACT

A footwear measuring device and a method for providing a service thereof are provided. The method includes acquiring information on a footwear internal space and deformation information of the footwear internal space from a measuring device inserted into the footwear, generating three-dimensional (3D) information including a plurality of specific points based on the information on the footwear internal space and the deformation information, and comparing the generated 3D information with pre-stored information on a user foot and providing matching information of the footwear with respect to the user foot based on a result of the comparing.

12 Claims, 23 Drawing Sheets

(51) Int. Cl.
*G01B 11/28* (2006.01)
*G01B 5/00* (2006.01)
*G01B 11/245* (2006.01)

(58) Field of Classification Search
USPC .............. 33/6, 2 R, 3 R, 3 B, 3 C, 17 R, 542
See application file for complete search history.

(56) References Cited

U.S. PATENT DOCUMENTS

| | | | | |
|---|---|---|---|---|
| 1,992,153 A | * | 2/1935 | Bliss | A43D 1/06 33/3 A |
| 2,043,649 A | * | 6/1936 | Bliss | A43D 1/06 33/3 A |
| 3,120,057 A | * | 2/1964 | Ludwig | A43D 1/06 33/3 A |
| 6,163,971 A | * | 12/2000 | Humphries, Jr. | A43D 1/02 33/3 A |
| 6,192,593 B1 | | 2/2001 | Borchers et al. | |
| 7,446,884 B2 | | 11/2008 | Massen | |
| 7,516,560 B2 | | 4/2009 | Long | |
| 7,992,243 B2 | | 8/2011 | Cook et al. | |
| 8,763,261 B1 | | 7/2014 | Kemist | |
| 9,119,442 B2 | | 9/2015 | Oberhofer | |
| 9,460,557 B1 | * | 10/2016 | Tran | B29C 64/386 |
| 9,514,487 B2 | * | 12/2016 | Wilkinson | A41H 1/00 |
| 9,700,104 B2 | | 7/2017 | Dong | |
| 2014/0096406 A1 | | 4/2014 | Oberhofer | |
| 2016/0081435 A1 | * | 3/2016 | Marks | A43D 1/027 382/154 |
| 2016/0350833 A1 | * | 12/2016 | Andon | G06Q 30/0631 |
| 2017/0135415 A1 | * | 5/2017 | Ellis | H04W 4/70 |
| 2017/0284875 A1 | | 10/2017 | Walker | |
| 2018/0199657 A1 | * | 7/2018 | Kikukawa | A43B 5/12 |
| 2018/0300791 A1 | * | 10/2018 | Ganesan | G06Q 30/0601 |

FOREIGN PATENT DOCUMENTS

| | | | | |
|---|---|---|---|---|
| EP | 0507709 A1 | * | 10/1992 | .............. A43D 1/06 |
| EP | 2710914 A9 | | 6/2014 | |
| JP | S61-99801 A | | 5/1986 | |
| JP | H07-42 B2 | | 1/1995 | |
| KR | 10-2014-0128441 A | | 11/2014 | |
| KR | 10-2015-0006708 A | | 1/2015 | |
| WO | WO-2009006989 A1 | * | 1/2009 | .............. A43D 1/06 |
| WO | 2014-000426 A1 | | 1/2014 | |
| WO | WO-2017045102 A1 | * | 3/2017 | .............. A43D 1/06 |

\* cited by examiner

FOOTWEAR INTERNAL SPACE MEASURING DEVICE AND METHOD FOR PROVIDING SERVICE THEREOF

CROSS-REFERENCE TO RELATED APPLICATION(S)

This application claims the benefit under 35 U.S.C. § 119(e) of a U.S. Provisional application filed on Nov. 17, 2016 in the U.S. Patent and Trademark Office and assigned Ser. No. 62/423,279, and under 35 U.S.C. § 119(a) of a Korean patent application filed on Feb. 15, 2017 in the Korean Intellectual Property Office and assigned Serial number 10-2017-0020646, the entire disclosure of each of which is hereby incorporated by reference.

TECHNICAL FIELD

The present disclosure relates to a footwear internal space measuring device and a method for providing a service thereof. More particularly, the present disclosure relates to a measuring device for measuring a footwear internal space using a fixer and a sensor and an external electronic device for generating three-dimensional (3D) information on the footwear internal space using the measuring device.

BACKGROUND

By virtue of development of Internet technology, consumption patterns of consumers have been largely changed. For example, when a consumer wants to purchase goods, he or she needs to directly visit an offline store, but, recently, a consumer is capable of accessing an online store anywhere and anytime using a computer, a smartphone, or the like so as to easily purchase goods.

However, despite convenience of an online store, when consumers purchase a specific good, he or she prefers an offline store due to specific reason.

For example, when a consumer intends to purchase footwear, he or she may prefer purchase of footwear in an offline store to purchase of footwear in an online store. When footwear ordered at an online store does not fit a user foot, a user needs to exchange the purchased footwear or to get refund. Due to this inconvenience, a user directly wears and purchases footwear at an offline store in many cases.

To overcome this issue, information on an actual length, etc., along with a footwear size is provided to guide consumers purchase decision at an online store that sells footwear but, various factors such as a user foot width, a user toe length, and a user foot height need to be considered to actually purchase footwear and, accordingly, it is difficult to purchase footwear that well fits a user using an actual footwear size.

Although there is technology for measuring a footwear internal space, since only the length and width of a foot are considered, it is not possible to acquire numerous amount of information, and since expensive measuring equipment is required, actual users are not capable of using the technology, or the type, material, etc. of footwear are not frequently capable of being considered.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a measuring device for generating a footwear internal space as three-dimensional (3D) information to measure an accurate footwear size and comparing the measured 3D information with an actual foot of a consumer to match a footwear appropriate to a consumer, and a method for providing a service of the measuring device.

In accordance with an aspect of the present disclosure, a measuring device for measuring a footwear internal space is provided. The device includes a main body inserted into footwear, a fixer configured to be moved in an outer direction from the main body and to fix the measuring device to the footwear in response to the main body being inserted into the footwear, a sensor configured to acquire sensing data for determining information on the footwear internal space when the measuring device is fixed to the footwear by the fixer, a transceiver configured to communicate with an external electronic device, and at least one processor configured to generate the information on the footwear internal space and deformation information of the footwear internal space and to control the transceiver to transmit the generated information to the external electronic device, based on data of a moving distance of the fixer and the sensing data acquired by the sensor.

The fixer may further include a motor and, the processor may control the motor to separate the fixer from the main body and to move the fixer in an outer direction, in response to a space measurement start command being input.

The processor may control the motor to stop movement of the fixer in response to a preset user command being detected in the fixer.

The processor may determine the moving distance of the fixer to acquire data of the moving distance of the fixer, based on a movement amount of the motor.

The sensor may include at least one of a proximity sensor, a laser sensor, and an infrared sensor.

In accordance with another aspect of the present disclosure, a method of controlling an electronic device is provided. The electronic device includes acquiring information on a footwear internal space and deformation information of the footwear internal space from a measuring device inserted into the footwear to acquire the information on the footwear internal space, processing the acquired information on the footwear internal space to generate 3D information including a plurality of specific points, and comparing the 3D information with pre-stored information on a user foot and providing matching information of the footwear with respect to the user foot based on a result of the comparing.

The providing of the matching information may include determining whether the footwear is right footwear or left footwear based on the 3D information.

The generating of the 3D information may include generating the 3D information using a line for connecting at least two points among the plurality of specific points.

The method may further include transmitting a matching result of the footwear with respect to the user foot to a user equipment device.

The transmitting of the matching result may include transmitting recommendation information for footwear matched with the user foot when the footwear is not matched with the user foot.

In accordance with another aspect of the present disclosure, a computer readable recording medium is provided. The recording medium includes recorded thereon a program for executing a method of transmitting a command of a control method of an electronic device, the control method of the electronic device including acquiring information on a footwear internal space and deformation information of the footwear internal space from a measuring device inserted into the footwear to acquire the information on the footwear internal space, processing the acquired information on the footwear internal space to generate 3D information containing a plurality of specific points, and comparing the 3D information with pre-stored information on a user foot and providing matching information of the footwear with respect to the user foot based on a result of the comparing.

The providing of the matching information may include determining whether the footwear is right footwear or left footwear based on the 3D information.

The generating of the 3D information may include generating the 3D information using a line for connecting at least two points among the plurality of specific points.

The control method may further include transmitting a matching result of the footwear with respect to the user foot to a user equipment device.

The transmitting of the matching result may include transmitting recommendation information for footwear matched with the user foot when the footwear is not matched with the user foot.

According to diverse various embodiments of the present disclosure, 3D information on a footwear internal space may be generated, where the 3D information may be matched with a user foot to provide a matching result to a consumer to help a user to purchase footwear and to provide information on the user foot.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
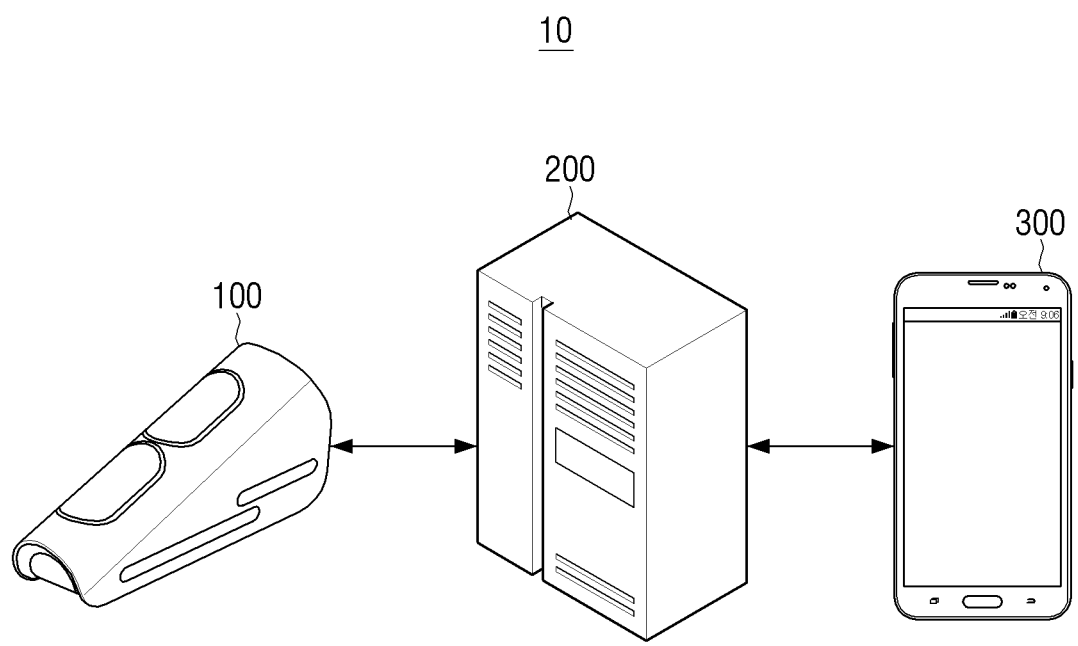
FIG. 1 is a diagram of an example of a footwear measuring device system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terminology used herein will be described in brief and certain various embodiments of the present disclosure will now be described in greater detail.

Most of the terms used herein are general terms that have been widely used in the technical art to which the present disclosure pertains. However, some of the terms used herein may be created reflecting intentions of technicians in this art, precedents, or new technologies. Also, some of the terms used herein may be arbitrarily chosen by the present applicant. In this case, these terms are defined in detail below. Accordingly, the specific terms used herein should be understood based on the unique meanings thereof and the whole context of the present disclosure.

As the disclosure allows for various changes and numerous embodiments, particular embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure. In the description of the present disclosure, certain detailed explanations of related art are omitted when it is deemed that they may unnecessarily obscure the essence of the disclosure.

The terms such as "first" and "second" are used herein merely to describe a variety of constituent elements, but the constituent elements are not limited by the terms. The terms are used only for the purpose of distinguishing one constituent element from another constituent element.

It will be further understood that the terms "comprises" and/or "comprising" when used in this specification, specify the presence of stated features, integers, operations, elements, and/or components, but do not preclude the presence or addition of one or more other features, integers, operations, elements, components, and/or groups thereof.

In various embodiments of the present disclosure, the terms, such as 'unit' or 'module', etc., should be understood as a unit that processes at least one function or operation and that may be embodied in a hardware manner, a software manner, or a combination of the hardware manner and the software manner. In addition, a plurality of 'modules' or a plurality of 'units' may be integrated into at least one module to be embodied as at least one processor except for a 'module' or a 'unit' that needs to be embodied as a specific hardware.

In various embodiments of the present disclosure, when it is described that a certain part is "connected" to another part, it should be understood that the certain part may be directly connected to another part or electrically connected to another part via another part in the middle. In addition, it should be understood that the certain part may be physically connected to another part or may also be wirelessly connected to another part. In addition, when a certain part "includes" a certain component, this indicates that the part may further include another component instead of excluding another component unless there is no different disclosure.

Various embodiments of the present disclosure are described in detail so as for those of ordinary skill in the art to easily implement with reference to the accompanying drawings. However, the present disclosure may be implemented in various different forms and is not limited to these embodiments. To clearly describe the present disclosure, a part without concerning to the description is omitted in the drawings, and like reference numerals in the specification denote like elements.

FIG. 1 is a diagram of an example of a footwear measuring device system 10 according to an embodiment of the present disclosure.

Referring to FIG. 1, the footwear measuring device system 10 may include the measuring device 100, the electronic device 200, and the user equipment device 300.

The measuring device 100 may be a component that is inserted into a footwear internal space to acquire information on the footwear internal space. In this case, as described below, the measuring device 100 may include a fixer and a sensor in order to measure the footwear internal space.

The electronic device 200 may receive the information on the footwear internal space from the measuring device 100. In more detail, the electronic device 200 may process the received information on the footwear internal space to generate three dimensional (3D) information on the footwear internal space.

The user equipment device 300 may transmit a user command of controlling the measuring device 100 to the electronic device 200 and the electronic device 200 may transmit the received user command to the measuring device 100. The measuring device 100 that receives the user command may be operated to acquire data for measuring the footwear internal space.

The user equipment device 300 may acquire information on a user foot size. The user equipment device 300 may receive user foot information and 3D information on the footwear internal space, determine whether the corresponding footwear is appropriate for a user, and provide the result.

In this case, the user equipment device 300 may include at least one of, for example, a smartphone, a tablet personal computer (PC), a mobile phone, a video telephone, a desktop PC, a laptop PC, a netbook computer, a workstation, a personal digital assistant (PDA), a portable multimedia player (PMP), or a wearable device.

According to an embodiment of the present disclosure, the electronic device 200 may be a server that stores, transmits, and receives data. In this case, some of the aforementioned functions of the electronic device 200 may be performed by the user equipment device 300. For example, when the electronic device 200 is configured as a server, the user equipment device 300 may process the footwear internal space information received from the server to generate 3D information on the footwear internal space. However, the present disclosure is not limited to this structure and the electronic device 200 may perform the function of the user equipment device 300 or, needless to say, the measuring device 100 may perform all of the functions of the electronic device 200 and the user equipment device 300.

Figure 2A:
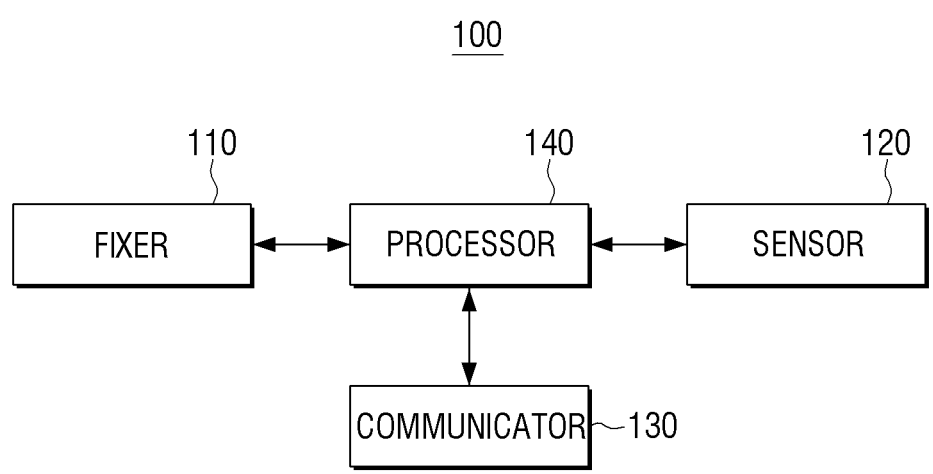
FIGS. 2A and 2B are blocks diagrams showing a structure of a measuring device according to an embodiment of the present disclosure.
Figure 2B:
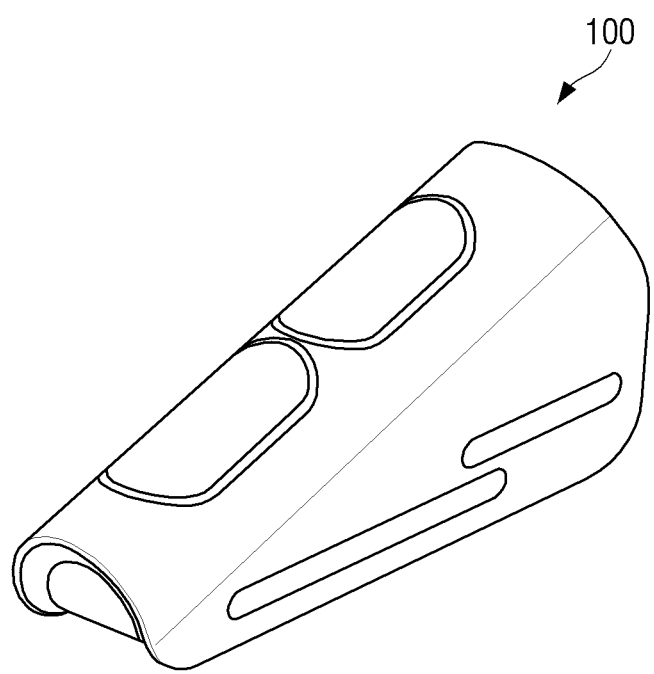

FIGS. 2A and 2B are blocks diagrams showing a structure of a measuring device according to an embodiment of the present disclosure.

Referring to FIG. 2A, the measuring device 100 may include a fixer 110, a sensor 120, a communicator 130, and a processor 140.

In more detail, the measuring device 100 may be configured in the same form as in FIG. 2B. However, the structure is not limited to the form shown in FIG. 2B and, needless to say, the measuring device 100 may be configured in various forms.

The fixer 110 may be attached to a main body of the measuring device 100. When the measuring device 100 is inserted into footwear and receives a user command for acquiring the footwear internal space information, the fixer 110 may be moved in an outer direction from the main body and may fix the measuring device 100 to the footwear.

In this case, the fixer 110 may be moved using various methods. For example, the measuring device 100 may include a motor and the fixer 110 may be moved by the motor. However, the present disclosure is not limited to the embodiment and, needless to say, the fixer 110 may be fixed to the footwear internal space using a load cell, a pressure sensor, or the like.

In this case, the fixer 110 may fix the measuring device 100 to the footwear and may also extend the footwear internal space. That is, after the fixer 110 is moved from the main body and the measuring device 100 is fixed to the footwear internal space, the fixer 110 may also be moved to extend the footwear internal space before a preset force or pressure is transmitted to the fixer 110. That is, the measuring device 100 may simply measure only the internal space of the footwear and may also measure the extended internal space in consideration of the material and elasticity of the footwear.

The sensor 120 may acquire detailed information on the footwear internal space. In more detail, when the measuring device 100 is fixed to the footwear by the fixer 110, the sensor 120 may acquire the information on the footwear internal space. In this case, the sensor 120 may include at least one of a proximity sensor, a laser sensor, and an infrared sensor. However, the present disclosure is not limited to this configuration and, needless to say, the sensor 120 may include various types of sensors for measuring a distance.

The communicator 130 may communicate with an external device. In more detail, the communicator 130 may receive a user input for measuring the footwear internal space from the external electronic device 200. The communicator 130 may transmit the acquired footwear internal space information to the external electronic device 200.

The processor 140 may control an overall operation of the measuring device 100. In more detail, the processor 140 may control the communicator 130 to transmit the footwear internal space information including data of a moving distance of the fixer 110 and sensing data acquired by the sensor 120 to the external electronic device 200.

The processor 140 may control the communicator 130 to receive a user command for measuring the footwear internal space. In response to the use command being received, the processor 140 may control the fixer 110 to measure the footwear internal space. For example, the processor 140 may control the motor to move the fixer 110 to be separated from the main body of the measuring device 100 and moved in an outer direction.

In response to a preset user command being detected in the fixer 110, the processor 140 may control the motor to stop movement of the fixer 110. In this case, the preset user command may be a value of pressure applied to the fixer 110.

In more detail, when the fixer 110 is moved to be very close to an internal surface of the footwear, if a pressure value detected by the fixer 110 is a preset pressure value, the processor 140 may stop movement of the fixer 110. In this case, the preset pressure value may be determined according to various factors such as the material of the footwear.

When the fixer 110 is stopped, the processor 140 may determine a moving distance of the fixer 110 to acquire data of the moving distance of the fixer 110. Data of the moving distance of the fixer 110 may be used along with the sensing data and used to generate 3D information on the footwear internal space.

Figure 3A:
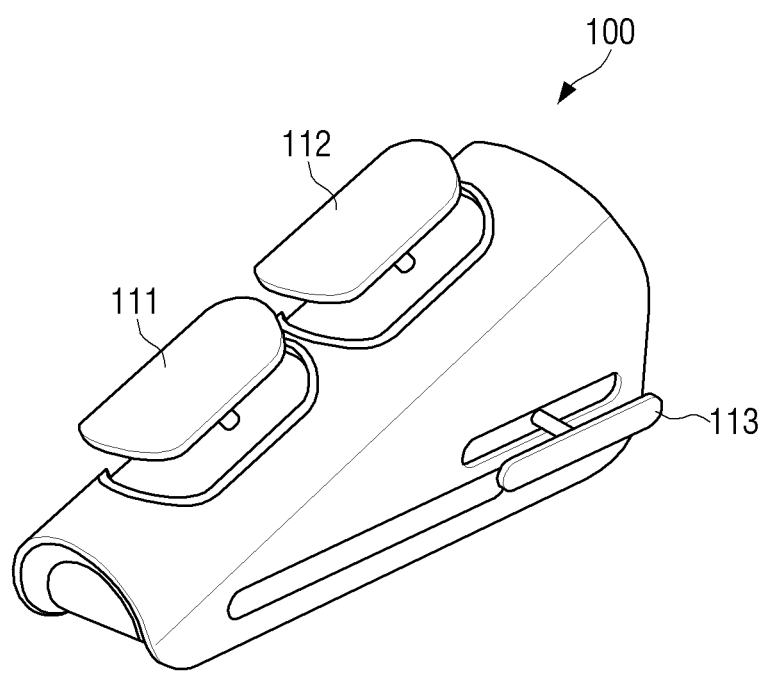
FIGS. 3A, 3B, and 3C are diagrams of an example of a method of measuring a footwear internal space according to an embodiment of the present disclosure.

FIG. 3A is a diagram of an example of a method of measuring a footwear internal space according to an embodiment of the present disclosure.

Referring to FIG. 3A, the fixer 110 may include a first fixer 111, a second fixer 112, a third fixer 113, and a fourth fixer (not shown). The first fixer 111 and the second fixer 112 may be separated from the main body of the measuring device 100 and moved in an upward direction of the footwear and the third fixer 113 and the fourth fixer (not shown) may be separated from the main body of the measuring device 100 and moved in right and left directions of the footwear.

In this case, the third fixer 113 and the fourth fixer (not shown) may be moved at the same speed. Accordingly, even if the measuring device 100 is positioned at an arbitrary position inside the footwear, the measuring device 100 may be positioned in the center of the footwear after movement of the fixer 110 is stopped. However, the present disclosure is not limited thereto, and, needless to say, the third fixer 113 and the fourth fixer (not shown) may be moved using various methods.

Although the present disclosure discloses the case in which the fixer includes four fixers, the present disclosure is not limited thereto. That is, it would be obvious that the fixer 110 further includes a fixer for moving the footwear in upward and downward directions and further includes two or more right and left fixers.

Figure 3B:
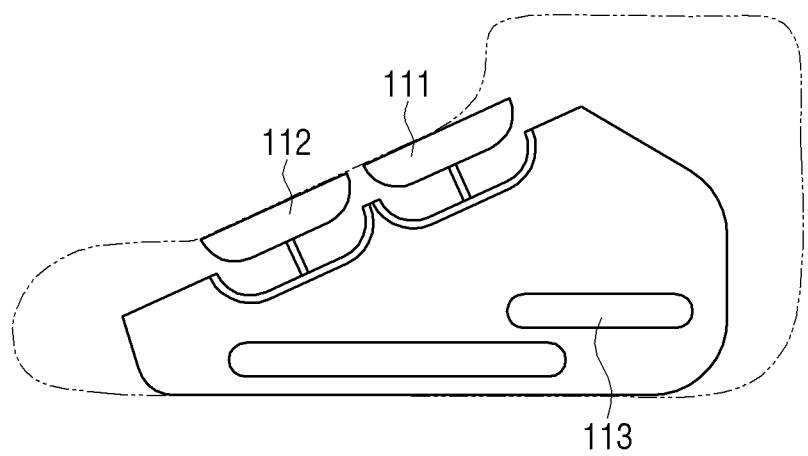
Figure 3C:
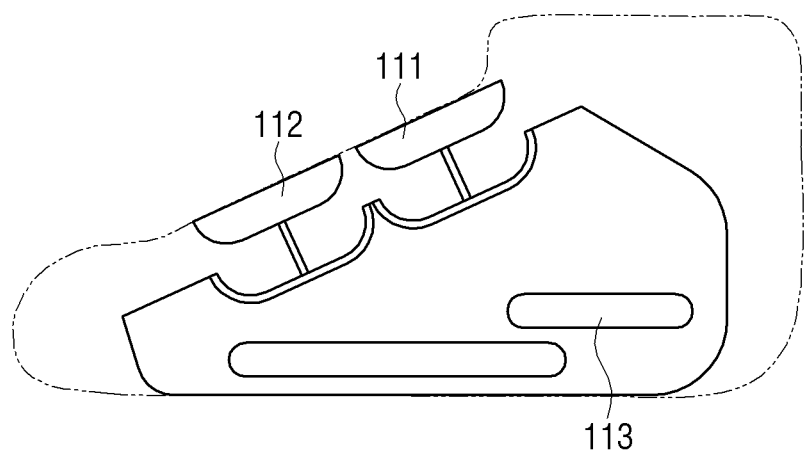

FIGS. 3B and 3C are diagrams of an example of a procedure of fixing a measuring device to footwear upon being inserted into a footwear internal space according to an embodiment of the present disclosure.

Referring to FIG. 3B, the fixer 110 may be separated from the main body of the measuring device 100 and may be moved until the fixer 110 comes in contact with an internal surface of the footwear. Although FIG. 3B shows only the case in which the first fixer 111 and the second fixer 112 are in contact with an upper portion of the footwear internal space, the third fixer 113 and the fourth fixer may also be moved using the same method until being in contact with right and left sides of the footwear internal space.

In this case, the fixer 110 may be stopped upon being in contact with the footwear, as shown in FIG. 3B. In this case, the measuring device 100 measures an internal space of footwear, a shape of which is not changed.

Referring to FIG. 3C, the fixer 110 may extend a footwear internal space. That is, as seen from FIG. 3C, the footwear internal space is extended compared with in FIG. 3B. In this case, the fixer 110 may be continuously moved after being in contact with an internal surface of the footwear according to a preset user command so as to extend the footwear internal space. In this case, an extension degree of the footwear may be variously determined according to the type, material, and hardness of the footwear.

The fixer 110 may include a pressure sensor. When the fixer 110 is in contact with the footwear internal space, the pressure sensor may measure a pressure applied to the fixer 110. When the measured pressure value is greater than a preset value, the processor 140 may control the fixer 110 to stop.

The fixer 110 may extend the footwear internal space. That is, the processor 140 may determine the extension and change degree of the footwear using the footwear internal space extended by the fixer 110.

In more detail, the processor 140 may increase the preset pressure value and measure the change degree of the footwear internal space. In more detail, when the pressure value is increased, the footwear internal space may be increased. In this case, even if the footwear internal space is extended using the same pressure value, the extension degree may be changed according to the material and design of the footwear. For example, footwear with high elasticity may be more extended than footwear with low elasticity. Accordingly, the processor 140 may determine the extension degree of footwear in the same pressure value to acquire information on the material of the footwear.

In this case, the preset pressure value may be determined in consideration of wearing feeling and deformed form of footwear of a user. That is, the processor 140 may control a pressure sensor to have different pressure values according to foot parts of the user. For example, the processor 140 may determine a footwear region corresponding to a partial region of a foot top point A (definition of each point will be described below with reference to FIGS. 6A to 7B) of a user as a region with a highest deformation degree. In this case, the processor 140 may set a pressure value of a pressure sensor for measuring the partial region of the foot top point A of the footwear as a higher value than a pressure value of a pressure sensor for measuring another portion.

The processor 140 may provide information on wearing feeling to a user in consideration of the material and design of footwear. In this case, material information of footwear may be determined based on elasticity of the footwear. In more detail, the processor 140 may determine a deformation of the footwear based on footwear internal space information and extended footwear internal space information. For example, the processor 140 may compare the footwear internal space information and the extended footwear internal space information to determine the elasticity of the footwear. In the case of footwear with high elasticity, the processor 140 may determine that the corresponding footwear is footwear with excellent wearing feeling and activity. Similarly, in the case of footwear with low elasticity, the processor 140 may determine that the corresponding footwear is footwear with poor wearing feeling and activity.

The design of footwear may be determined using the footwear internal space information. In more detail, the processor 140 may determine the measured footwear design based on data of footwear internal space information with specific design.

Figure 4A:
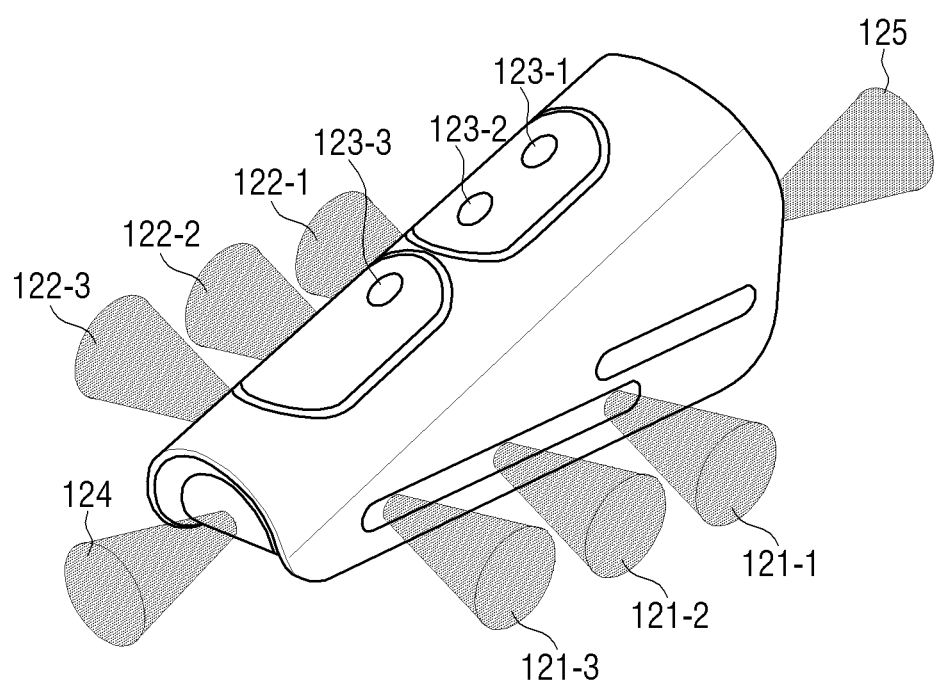
FIGS. 4A and 4B are diagrams of a method of measuring an internal space using a sensor by a measuring device according to an embodiment of the present disclosure.

FIG. 4A is a diagram of a method of measuring an internal space using a sensor by a measuring device according to an embodiment of the present disclosure.

Referring to FIG. 4A, the sensor 120 may include left sensors 121-1, 121-2, and 121-3, right sensors 122-1, 122-2, and 122-3, upper sensors 123-1, 123-2, and 123-3, a front sensor 124, and a rear sensor 125. However, the present disclosure is not limited to this configuration and, as necessary, various sensors may be added or the sensors may be omitted. For examples, the sensor 120 may include a sensor for measuring a left-upper direction or a right-upper direction so as to more accurately measure a footwear internal space.

As described above, when the measuring device 100 is fixed to the footwear by the fixer 110, the processor 140 may control the sensor 120 to acquire a sensing data value. In this case, the sensor 120 may sense various data containing information on a specific point. The data of the specific point and data sensed by the sensor 120 will be described with reference to FIGS. 6 and 7.

Figure 4B:
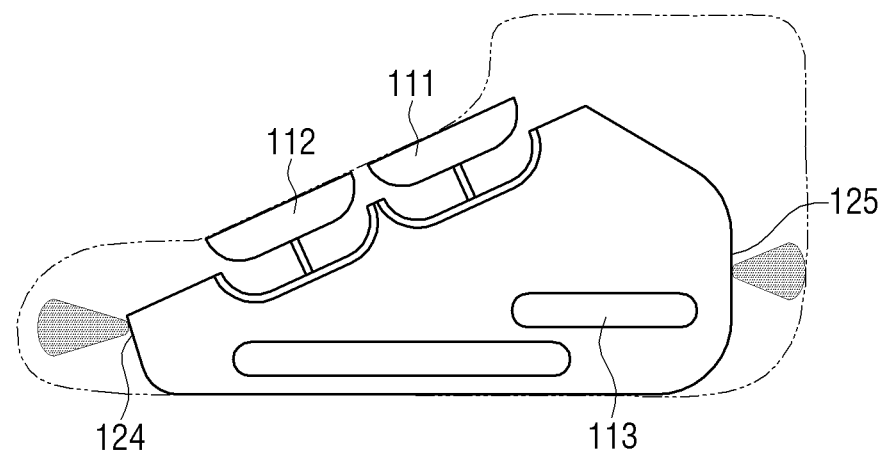

FIG. 4B is a diagram of an example of sensing a footwear internal space by a sensor when the measuring device is inserted into footwear according to an embodiment of the present disclosure.

Referring to FIG. 4B, a front sensor 124 and a rear sensor 125 of the sensor 100 may sense front and rear portions of the footwear internal space, respectively. Although FIG. 4B shows the case in which the front sensor 124 and the rear sensor 125 sense the footwear internal space, the present disclosure is not limited thereto and the left sensors 121-1, 121-2, and 121-3 and, needless to say, the right sensors 122-1, 122-2, and 122-3 may also sense the footwear internal space.

Figure 5A:
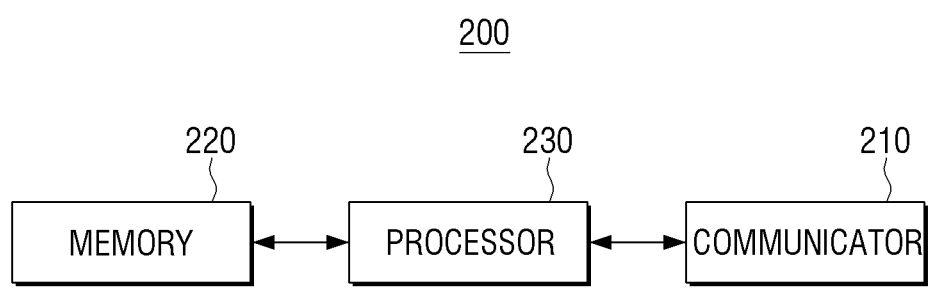
FIGS. 5A and 5B are block diagrams showing a configuration of an external electronic device according to an embodiment of the present disclosure.
Figure 5B:
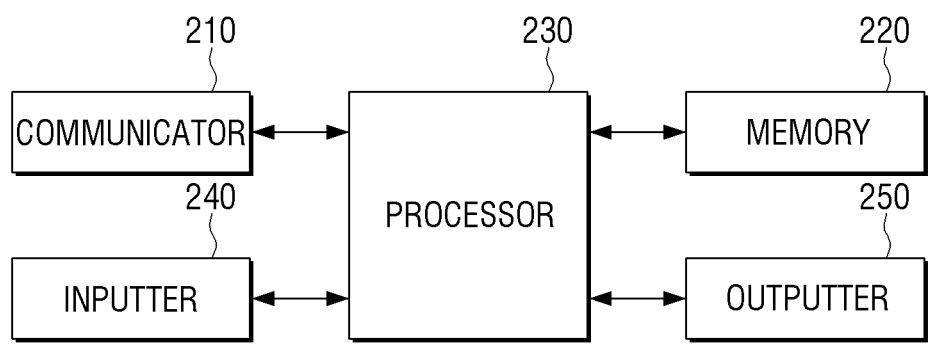

FIGS. 5A and 5B are block diagrams showing a configuration of the external electronic device 200 according to an embodiment of the present disclosure.

FIG. 5A is a schematic block diagram showing the configuration of the external electronic device 200 according to an embodiment of the present disclosure.

Referring to FIG. 5A, the external electronic device 200 may include the communicator 210, the memory 220, and the processor 230.

The communicator 210 (e.g., a transceiver) may communicate with the measuring device 100 and the user equipment device 300. In more detail, the communicator 210 may receive data of a moving distance of the fixer 110 and sensing data obtained by the sensor 120, from the measuring device 100. In addition, the communicator 210 may also receive information on a user foot from a user equipment device.

The memory 220 may store the data of the moving distance of the fixer 110 and the sensing data acquired by the sensor 120, which are received from the measuring device 100, and the information on the user foot received from the user equipment device 300.

The memory 220 may also store 3D information on the footwear internal space, which is formed using the data of the moving distance of the fixer 110 and the sensing data acquired by the sensor 120.

The processor 230 may control an overall operation of the electronic device 200. In more detail, the processor 230 may control the communicator 210 to receive the footwear internal space information from the measuring device 100.

The processor 230 may process the received footwear internal space information to generate 3D information. In this case, the 3D information may contain a plurality of specific points.

The processor 230 may control the communicator 210 to receive the information on the user foot from the user equipment device 300. The processor 230 may compare the 3D information on the footwear internal space, stored in the memory 220, and the information on the footwear internal space and provide matching information of footwear with respect to a user foot based on the comparison result, to a user.

In this case, when the 3D information on the footwear internal space and the information on the user foot are matched, the processor 230 may control the communicator 210 to transmit a message indicating that corresponding footwear is appropriate for a user to be worn, to the user equipment device 300.

When the 3D information on the footwear internal space and the information on the user foot are not matched, the processor 230 may control the communicator 210 to transmit recommendation information on the footwear matched with the user foot, to the user equipment device 300.

In this case, the recommendation information may be various information pieces. For example, the recommendation information may contain a footwear size appropriate for a user foot, a footwear brand, a footwear type, and so on.

FIG. 5B is a block diagram showing a structure of an external electronic device 200 in more detail according to an embodiment of the present disclosure.

The electronic device 200 may include an inputter 240 and an outputter 250 as well as a communicator 210, a memory 220, and a processor 230. However, the present disclosure is not limited to this structure and, as necessary, new components may be added or the components may be omitted.

Although not shown in FIG. 5B, the communicator 210 may include at least one of a WiFi chip, a bluetooth (BT) chip, a wireless communication chip, and a near field communication (NFC) chip. In particular, the WiFi chip and the BT chip may perform communication using a WiFi method and a BT method, respectively. When the WiFi chip or the BT chip is used, various connection information items such as a service set identifier (SSID) and a session key may be previously transmitted, communication is achieved using the connection information, and then various information items may be transmitted and received. The wireless communication chip may refer to a chip that performs communication according to various communication standards such as institute of electrical and electronics engineers (IEEE), Zigbee, $3^{rd}$ generation (3G), 3rd generation partnership project (3GPP), and long term evolution (LTE). In addition, the communication may further include an NFC chip that is operated using an NFC method. The NFC chip 214 may refer to a chip that operates in a NFC manner using a frequency band of 13.56 MHz among various radio-frequency identification (RFID) frequency bands such as 135 kHz, 13.56 MHz, 433 MHz, 860 to 960 MHz, and 2.45 GHz.

As described above, the communicator 210 may transmit and receive data to and from a measuring device 100 and a user equipment device 300.

The processor 230 may include a random-access memory (RAM), a read-only memory (ROM), a main central processing unit (CPU), first to n$^{th}$ interfaces, and a bus. In this case, the RAM, the ROM, the main CPU, the first to n$^{th}$ interfaces, and so on may be connected through a bus.

The ROM may store a command set, and the like for system booting. When a turn-on command is input to supply power, the main CPU may copy the operating system (O/S) stored in the memory 220 to the RAM according to a command stored in the ROM and execute the O/S to boot a system. When booting is completed, the main CPU may copy various programs stored in the storage to the RAM and execute the programs copied to the RAM to perform various operations.

The main CPU may access the memory 220 and perform booting using the O/S stored in the memory 220. In addition, the main CPU may perform various operations using various programs, contents, data items, and so on which are stored in the memory 220.

The first to n$^{th}$ interfaces may be connected to the above various components. One of the interfaces may be a network interface connected to an external device through a network.

The inputter 240 may receive various types of state information. For example, the inputter 240 may be combined with a detector to constitute a touch detector or may be configured as a keyboard or a microphone.

The outputter 250 may output various results generated by the processor 230. For example, the outputter 250 may be a display for displaying 3D information on an internal space of a footwear internal space or information on a user foot. The outputter 250 may be configured an audio outputter for outputting a result indicating whether a user foot and a footwear are matched in the form of audio.

Figure 6A:
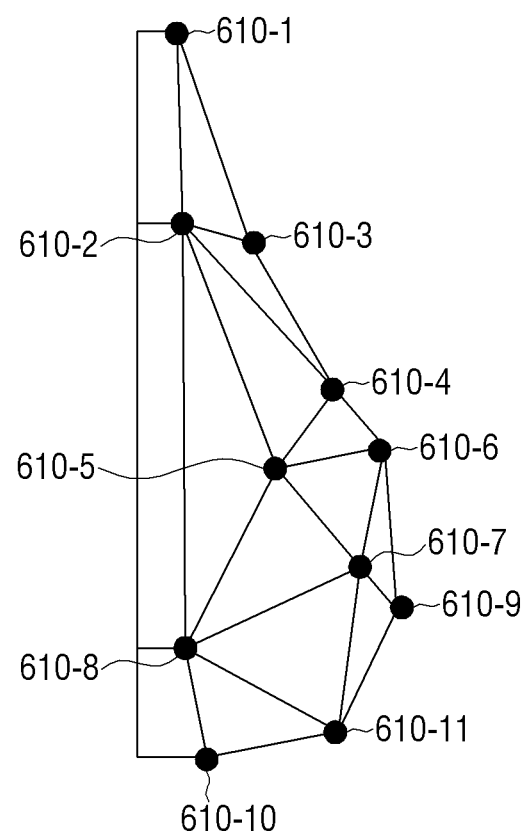
FIGS. 6A, 6B, and 6C are diagrams of an example of 3D information on a footwear internal space according to an embodiment of the present disclosure.
Figure 6B:
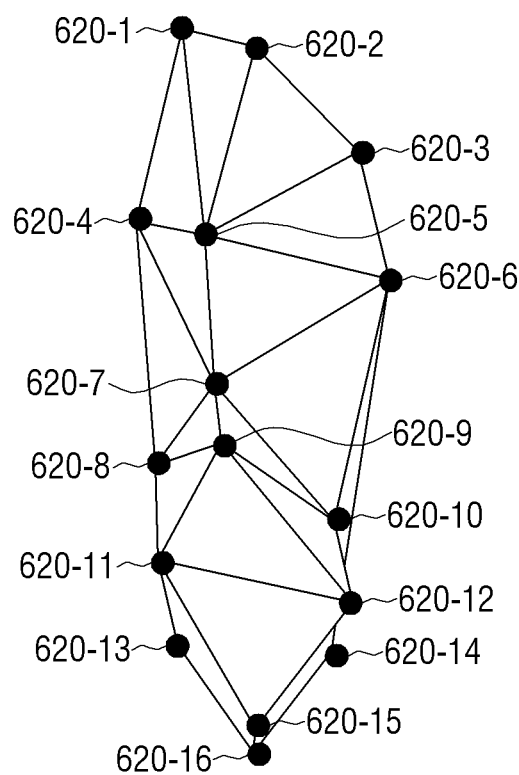
Figure 6C:
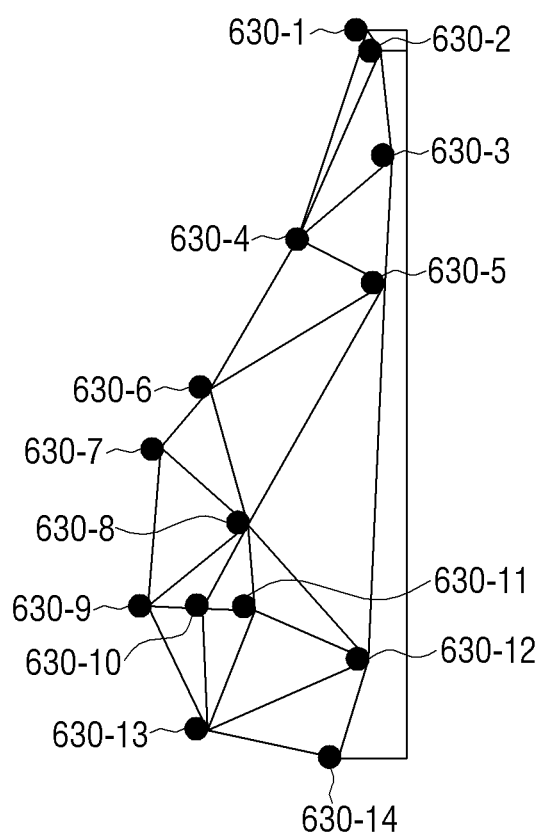

FIGS. 6A, 6B, and 6C are diagrams of an example of 3D information on a footwear internal space according to an embodiment of the present disclosure.

As described above, the processor 230 may generate the 3D information on the footwear internal space shown in FIGS. 6A to 6C using the footwear internal space information received from the measuring device 100. In this case, the processor 230 may generate 3D information using a specific point of the footwear internal space information.

In this case, the specific point may be a preset point. For example, FIG. 6A is a diagram showing an example of a footwear internal space with respect to an internal surface of footwear.

Referring to FIG. 6A, the 3D information may include specific points 610-1 to 610-11. In more detail, 3D information on the internal portion of the footwear may contain a foot tip point 610-1, a foot internal point 610-2, foot top points 610-3, 610-4, and 610-6, a foot-top internal point 610-5, ankle points 610-7 and 610-9, a heel width point 610-8, and heel points 610-10 and 610-11.

Referring to FIG. 6B, 3D information on footwear viewed from the above may contain a big toe point 620-1, a second toe point 620-2, a little toe point 620-3, a foot internal point 620-4, foot top points 620-5, 620-7, and 620-9, a foot edge point 620-6, heel width points 620-8, 620-10, 620-11, 620-12, 620-13, and 620-14, a top heel point 620-15, and a back heel point 620-16.

Referring to FIG. 6C, information on the footwear internal space with respect to an external surface of the footwear may include foot tip points 630-1 and 630-2, foot edge points 630-3 and 630-5, foot top points 630-4, 630-6, and 630-7, a foot-top edge point 630-8, ankle points 630-9, 630-10, and 630-11, a heel width point 630-12, a top heel point 630-14, and a back heel point 630-14.

That is, the sensor 120 of the measuring device 100 may sense data of various specific points as described above and the processor 230 of the electronic device 200, which receives a specific point, may connect specific points to acquire 3D information on the footwear internal space.

In this case, needless to say, the information on the specific point is not limited to the aforementioned titles and locations. For example, heel width points 620-8, 620-10, 620-11, 620-12, 620-13, and 620-14 shown in FIG. 6B may be subdivided into an internal arch point 620-8, an internal foot arch point 620-11, an internal ankle point 620-13, an edge arch point 620-10, an edge foot arch point 620-12, and an edge ankle point 620-14 and, as necessary, needless to say, various specific points may be added or omitted.

Figure 7A:
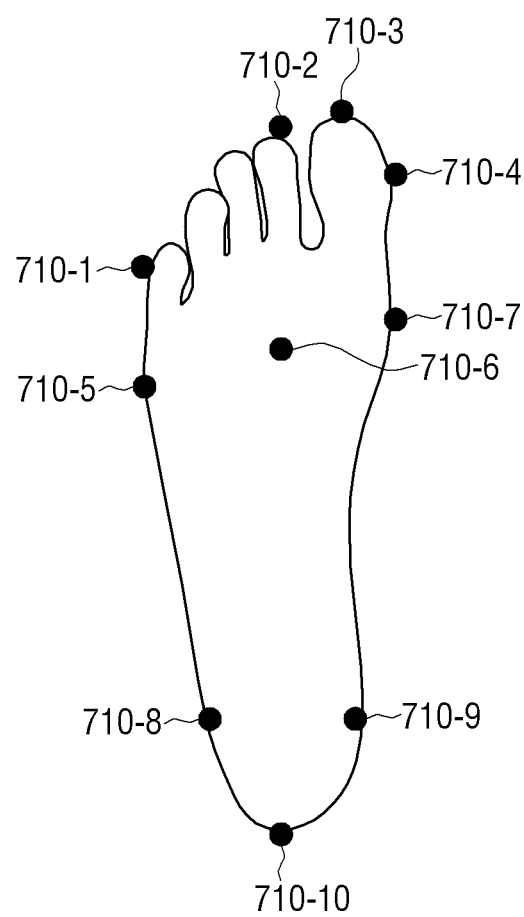
FIGS. 7A and 7B are diagrams of an example of a specific point according to an embodiment of the present disclosure.
Figure 7B:
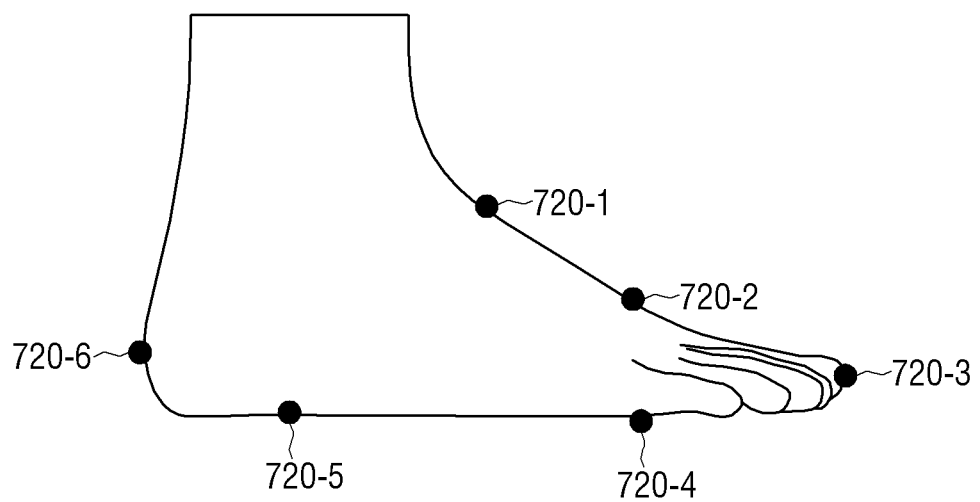

FIGS. 7A and 7B are diagrams of an example of a specific point according to another embodiment of the present disclosure.

FIG. 7A is a diagram showing an example of a user foot sole.

Referring to FIG. 7A, a specific point may include a little toe external point 710-1, a foot tip point 710-2, a big toe point 710-3, a big toe external point 710-4, a foot edge point 710-5, a foot center point 710-6, a foot internal point 710-7, a heel width A point 710-8, a heel width B point 710-9, and a heel point 710-10.

FIG. 7B is a diagram showing an example of a user foot viewed from the side.

Referring to FIG. 7B, a specific point may include a foot top point A 720-1, a foot top point B 720-2, a foot tip point 720-3, a center point 720-4, a heel width point 720-5, and a heel point 720-6.

The aforementioned specific point may be sensed by the sensor 120. However, the center points 710-6 and 720-4 may be intersections between a line for connection of the foot edge point 710-5 and the foot internal point 710-7 and a line for connection of the foot tip point 710-2 and the heel point 710-10.

A portion of the specific point may be determined by a combination of other specific points. Information on an angle or length of a specific portion may be determined by the combination of the aforementioned specific points. That is, detailed 3D information may be acquired through a combination of specific points. The processor 230 may more accurately display a footwear internal 3D space using the acquired various information pieces. Table 1 below shows various information pieces obtained by combining specific points.

TABLE 1

| Point A | Point B | Definition |
| --- | --- | --- |
| Heel point | Foot tip point | Foot length/Foot center line |
| Heel width A | Heel width B | Heel width |
| Heel width B | Foot edge point | External side of middle foot part |
| Heel width B | Foot internal point | Internal side of middle foot part |
| Foot edge point | Foot internal point | Foot width |
| Foot width | Foot length | Foot center point |
| Foot internal point | Big toe external point | Internal side of front foot part |
| Foot edge point | Little toe external point | External side of front foot part |

TABLE 1-continued

| Point A | Point B | Definition |
| --- | --- | --- |
| Foot internal point | Foot center line | Big toe point |
| Foot center point | Foot edge point | External width |
| Foot center point | Foot internal point | Internal width |
| Foot center point | Height of vertical axis | Foot top point B |
| 50% point of foot length | Height of vertical axis | Foot top point A |
| Foot top point A | Foot top point B | Foot top inclination |
| Heel point | Heel width point | Rear foot part |
| Heel width point | Center point | Middle foot part |
| Foot center point | Foot tip point | Front foot part |

Referring to FIG. 7A, the line for connection of the heel point 710-10 and the foot tip point 710-2 may indicate a foot length. In this case, generally, the foot tip point may be a second toe point but is not limited thereto. In this case, the line for connection of the heel point 710-10 and the foot tip point 710-2 may be referred to as a foot center line.

The line for connection of the heel width A point 710-8 and the heel width B point 710-9 may indicate a heel width. The heel width points 710-8 and 710-9 may be opposite ends of locations corresponding to 16% of a foot length from a heel. However, the present disclosure is not limited to this numerical value and, generally, a heel width point may be positioned at a protrusion of a shape of a user foot.

The foot center point 710-6 may be an intersection between a line indicating a foot length and a line indicating a foot width. In more detail, the foot center point 710-6 may be an intersection between a line for connection of the heel point 710-10 and the foot tip point 710-2 and a line for connection of the heel width A point 710-8 and the heel width B point 710-9.

A user foot may be divided into and represented by a front foot part, a middle foot part, and a rear foot part. In this case, the front foot part may be to the foot center point 710-6 from the foot tip point 710-2, the middle foot part may be to the heel width points 710-8 and 710-9 from the foot center point 710-6, and the rear foot part may be to the heel point 710-10 from the heel width points 710-8 and 710-9.

In more detail, the front foot part may be divided into an internal side of the front foot part and an external side of the front foot part. The internal side of the front foot part may be to the big toe external point 710-4 from the foot internal point 710-7 and the external side of the front foot part may be to the little toe external point 710-1 from the foot edge point 710-5. In this case, information on a footwear internal space may be indicated in more detail using lengths and angles of the internal side of the front foot part and the external side of the front foot part.

The big toe point 710-3 may be embodied using a foot center line (a first line) and a line (a second line) positioned in parallel to the foot center line through the foot internal point 710-7. An intersection between a big toe and a line (a third line) positioned in parallel to the foot center line positioned between the first line and the second line may be the big toe point 710-3. In this case, a distance to the first line from the third line may be the same as a distance to the second line from the third line but is not limited thereto and, needless to say, as necessary, the third line may be positioned at various locations.

A width to the foot edge point 710-5 from the foot center point 710-6 may be referred to as an external width and a width to the foot internal point 710-7 from the foot center point 710-6 may be referred to as an internal width.

Referring to FIG. 7B, the foot top point B 720-2 may be positioned at a point perpendicular to the center point 720-4.

The foot top point A 720-1 may be positioned at a point perpendicular to a point corresponding to 50% of a foot length but is not limited thereto.

In this case, foot top inclination may be obtained using the foot top point A 720-1 and the foot top point B 720-2. That is, an inclination angle of a foot top and a length of the foot top may be calculated using the foot top point A 720-1 and the foot top point B 720-2.

Like in the description of FIG. 7A, a part between the foot tip point 720-3 and the foot center point 720-4 may be the front foot part, a part between the foot center point 720-4 and the heel width point 720-5 may be the middle foot part, and a part between the heel width point 720-5 and the heel point 720-6 may be the rear foot part.

With reference to FIGS. 6A, 6B, 6C, 7A, and 7B, the information on various specific points and the combination of the specific points has been described above. The processor 230 may generate 3D information on the footwear internal space through the aforementioned information on the specific points and the combination of the specific points. The information on the specific points and the combination of the specific points may be used to generate 3D information on the footwear internal space and may also be used to generate 3D information on a user foot.

However, FIGS. 6A, 6B, 6C, 7A, and 7B are purely an embodiment of the present disclosure and, thus, the present disclose is not limited thereto. Accordingly, needless to say, various specific points may be determined based on anatomical information of a foot.

Figure 8A:
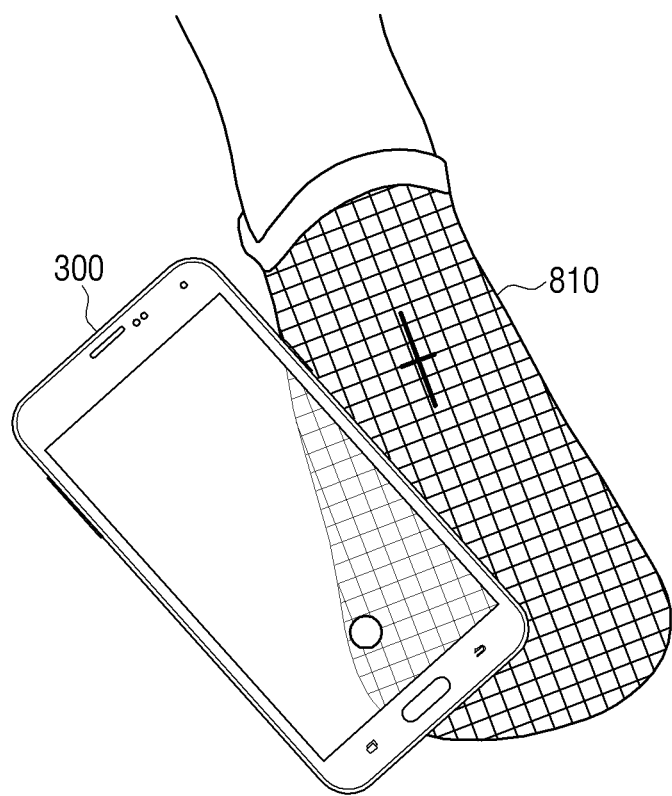
FIGS. 8A and 8B are diagrams of an example of a method of acquiring 3D information on a user foot using a user equipment device according to various embodiments of the present disclosure.
Figure 8B:
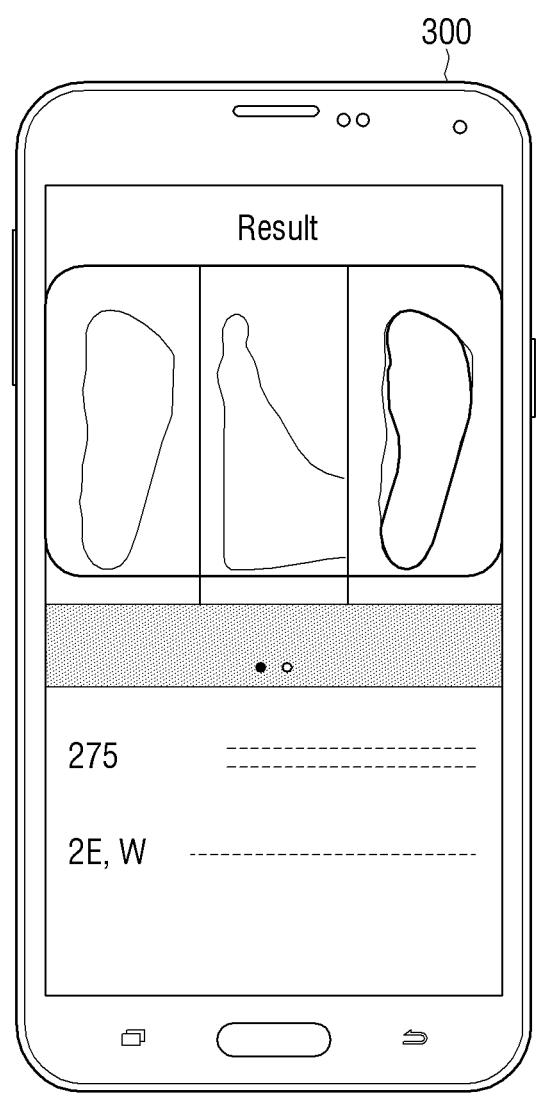

FIGS. 8A and 8B are diagrams of an example of a method of acquiring 3D information on a user foot using a user equipment device according to various embodiments of the present disclosure.

Referring to FIG. 8A, a user may wear a measuring footwear 810 shaped like a foot in order to measure his or her foot shape. In this case, the measuring footwear 810 may have a cross mark indicating a center of a foot and may be configured by grids to determine information on sizes and locations.

The user may measure his or her foot using the user equipment device 300. For example, the user equipment device 300 may measure accurate information on a user foot in consideration of anatomical information via a real-time 3D reconstruction scheme using video photography. However, the present disclosure is not limited to this method and the 3D information on the user foot may be acquired using various methods, needless to say. For example, the user equipment device 300 may photograph a foot at multiple angles using a camera and acquire the information on the user foot using the photograph result.

Referring to FIG. 8B, the measurement result may be displayed on the user equipment device 300 such that a user checks information of his or her foot. The measurement result may be transmitted to the external electronic device 200 in order to determine whether specific footwear and his or her foot are matched.

Figure 9A:
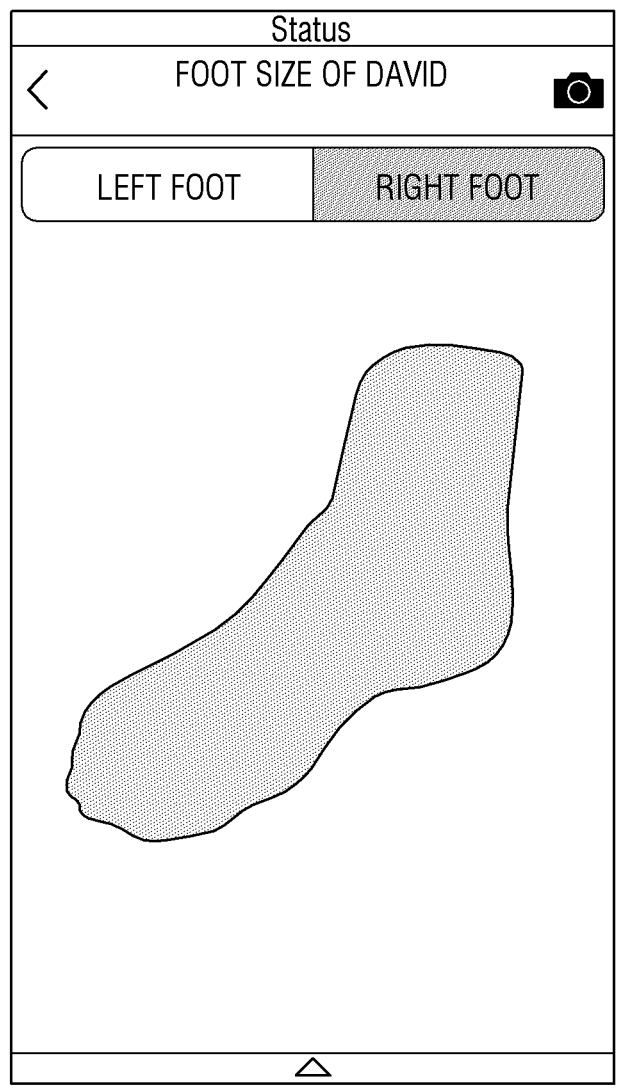
FIGS. 9A, 9B, and 9C are diagrams showing an example of a user interface (UI) of a user equipment device according to an embodiment of the present disclosure.
Figure 9B:
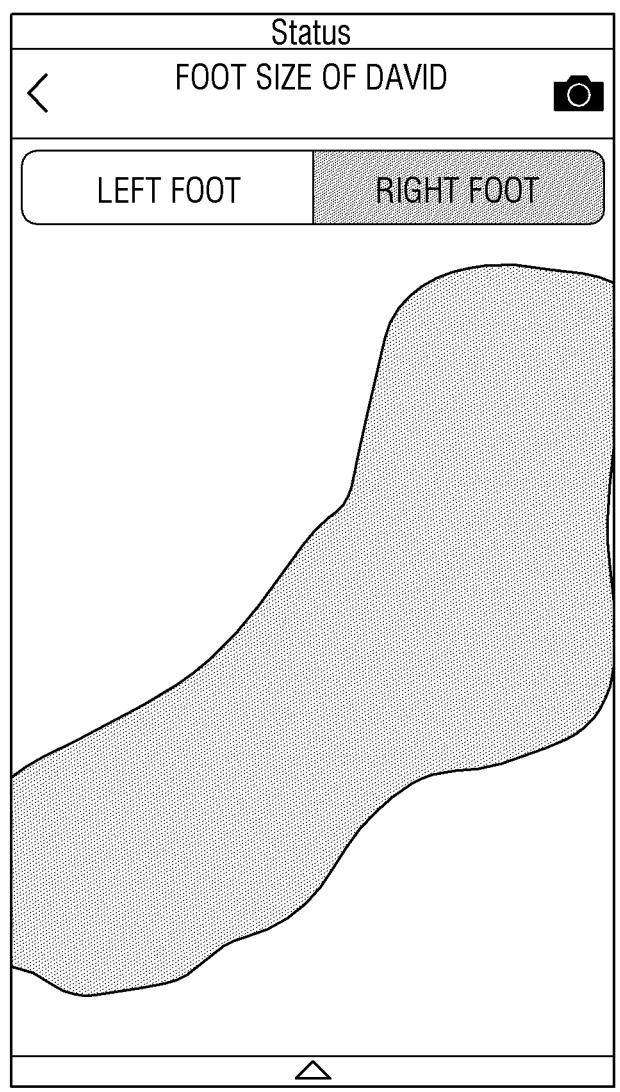
Figure 9C:
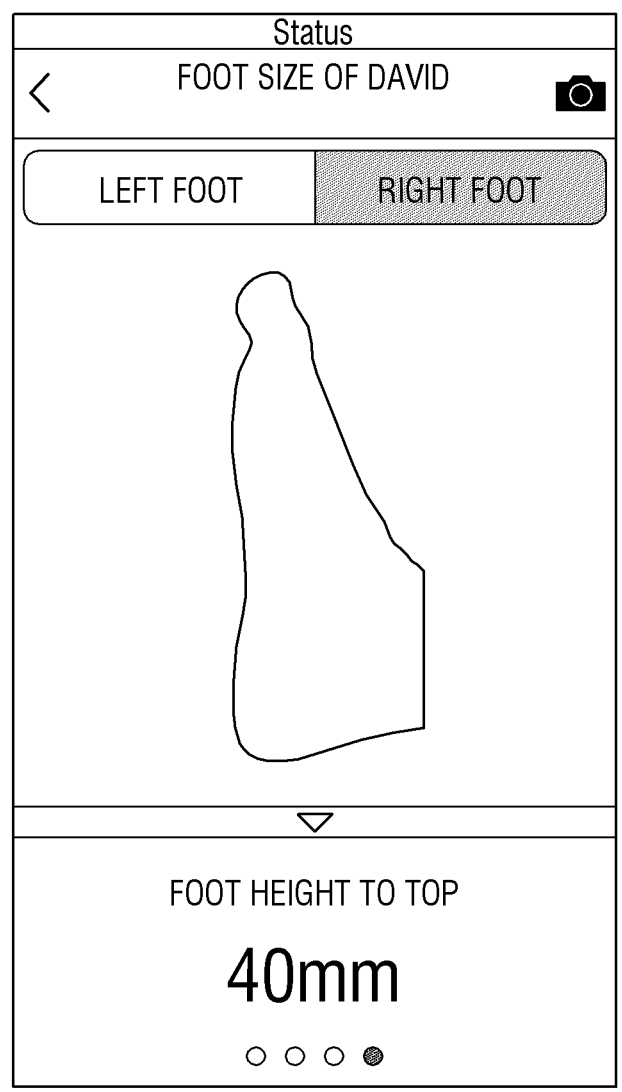

Referring to FIGS. 9A, 9B, and 9C, the user may check the information on his or her foot in detail. For example, as shown in FIG. 9A, the user may divide his or her foot into left and right foots and check shape and information on his or her foot and, as shown in FIG. 9B, may enlarge and check a shape of his or her foots. In this case, the foot shape may be a 3D image and, as necessary, the user may freely check upper and lower parts, right and left parts, and front and rear parts of a foot.

The user may check detailed information on his or her foot. As shown in FIG. 9C, the user may check information on his or her foot height measured to a foot top. In this case, the information checked by the user may be information on the specific point and the combination of the specific points, which have been described with reference to FIGS. 6A, 6B, 6C, 7A, and 7B.

Although not shown in FIGS. 9A, 9B, and 9C, the user equipment device 300 may receive information on footwear from the external electronic device 200. In this case, the information on the footwear may be information on a footwear internal space. The user equipment device 300 may display the information on the footwear or the information on the footwear internal space and a user may check the information on the footwear using the same method as the method of checking a user foot in FIGS. 9A, 9B, and 9C. That is, the user may check information on right footwear and left footwear, enlargement/reduction information of the footwear, and detailed information (a foot height measured to a foot top, etc.) of the footwear.

Figure 10:
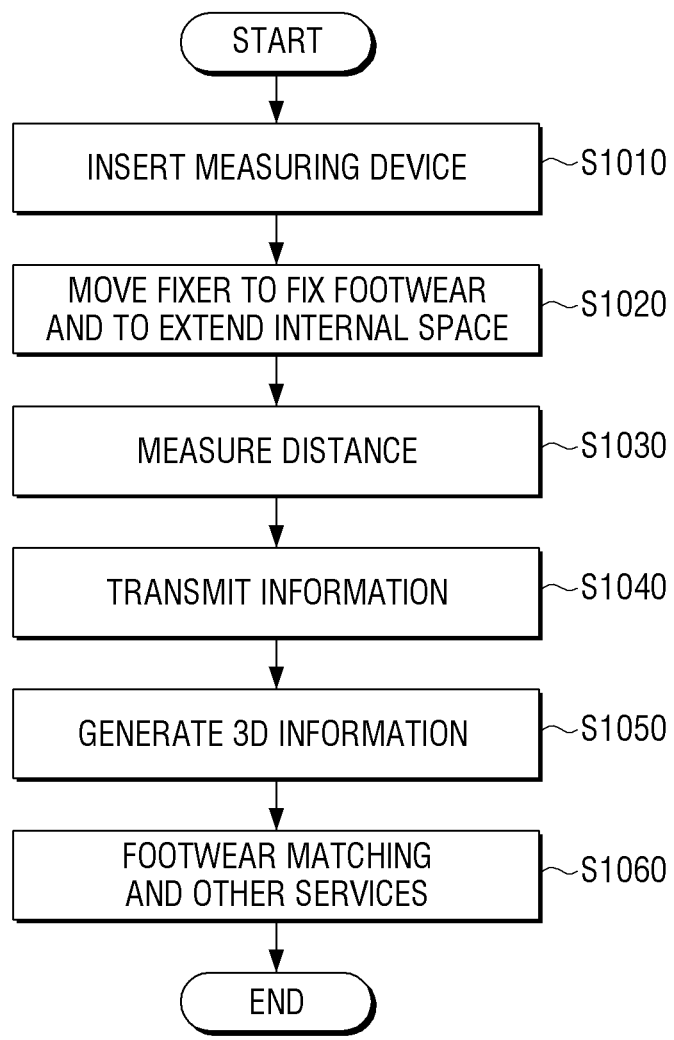
FIG. 10 is a flowchart of a footwear measuring system according to an embodiment of the present disclosure.

FIG. 10 is a flowchart of a footwear measuring system according to an embodiment of the present disclosure.

Referring to FIG. 10, the measuring device 100 may be inserted into a footwear internal space at operation S1010. In response to a user command being received through the communicator 130, the processor 140 may move the fixer 110. The fixer 110 may be moved to be very close to an internal surface of the footwear so as to fix the measuring device 100 to the footwear and may also extend the footwear internal space at operation S1020.

When the measuring device 100 is fixed to the footwear by the fixer 110, the processor 140 may measure data of a moving distance of the fixer 110 and control the sensor 120 to measure sensing data of the footwear internal space at operation S1030. In this case, the sensing data measured by the sensor 120 may include information on a specific point.

The processor 140 may control the communicator 130 to transmit the measured data to the external electronic device 200 at operation S1040. The processor 230 of the external electronic device 200 may control the communicator 210 to receive data from the measuring device 100 and store the received data in the memory 220.

The external electronic device 200 may generate 3D information on the footwear internal space using the received data at operation S1050. In this case, the 3D information may be generated using the information on the specific point and the information on the combination on the specific points.

When the processor 230 of the external electronic device 200 controls the communicator 210 to receive information on a user foot from the user equipment device 300, the processor 230 may compare the information on the user foot and the 3D information on the footwear internal space to provide footwear matching and other services at operation S1060.

In more detail, the user equipment device 300 may transmit information on a user foot and, simultaneously, may transmit information on footwear desired by the user. The processor 230 may acquire 3D information on an internal space of footwear requested by the user from the memory 220 and may compare the 3D information with the user foot.

In this case, when the 3D information on the footwear internal space and the user foot are matched, the processor 230 may control the communicator 210 to transmit a message indicating that footwear selected by the user is appropriate for the user, to the user equipment device 300.

In this case, when the 3D information on the footwear internal space and the user foot are not matched, the processor 230 may control the communicator 210 to transmit a message indicating that the footwear selected by the user is not appropriate for the user, to the user equipment device 300. Needless to say, the processor 230 may control the communicator 210 to transmit various information items for providing user convenience.

For example, the processor 230 may recommend footwear that is the most comfortable for the user foot. In this case, the recommendation reference may be any one of a footwear type (tennis shoes, dress shoes, and military boots), a footwear brand, or a material of footwear but, needless to say, the processor 230 may recommend footwear appropriate for a user according to various other references.

The processor 230 may identify a part of the footwear that is not matched with the user foot from the footwear selected by the user. For example, the processor 230 may indicate that a length between front and rear parts of footwear is appropriate but a foot width or a foot height measured to a foot top is not appropriate.

Although the measuring device 100 for measuring a footwear internal space and the method of controlling the measuring device 100 have been described according to the aforementioned various embodiments of the present disclosure, the various embodiments of the present disclosure are not limited thereto. That is, needless to say, the measuring device 100 and the control method according to the present disclosure may be used to measure an internal space of a deformable object. For example, the measuring device 100 may measure an internal space of clothes or bags and a deformation degree and provide the measurement result to a user.

Figure 11:
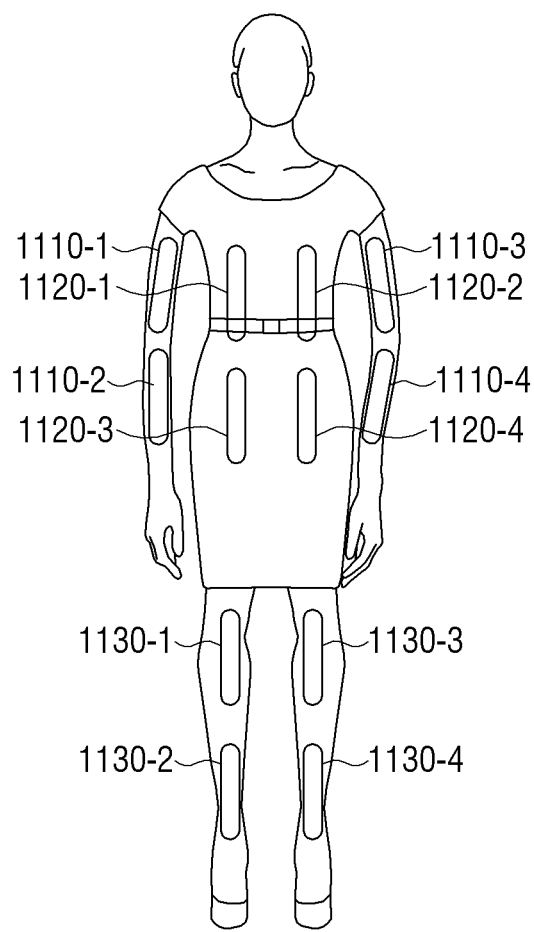
FIG. 11 is a diagram showing a measuring device according to an embodiment of the present disclosure.

FIG. 11 is a diagram showing a measuring device according to an embodiment of the present disclosure.

Referring to FIG. 11, the measuring device 100 may be of a type of mannequin. The technological idea of the present disclosure may also be applied to the measuring device 100 for measuring an internal space of clothes.

Referring to FIG. 11, the fixer 110 and the sensor 120 may include four pieces 1110-1, 1110-2, 1110-3, and 1110-4 at both arms, four pieces 1120-1, 1120-2, 1120-3, and 1120-4 at a torso, and four pieces 1130-1, 1130-2, 1130-3, and 1130-4 at both legs. However, the present disclosure is not limited thereto and, needless to say, the fixer 110 and the sensor 120 may be arranged at various positions. For example, the fixer 110 and the sensor 120 may be arranged at human joint parts with much movement.

In more detail, in the case of bottoms, the processor 140 may measure information on elasticity and deformation of a clothes region corresponding to a thigh part and may provide the information to a user such that the user with thick thighs selects clothes. In the case of a top, the processor 140 may measure information on elasticity and deformation of a clothes region corresponding to a chest size, an abdominal circumference, a forearm circumference, or an armpit part of clothes and may provide the information to the user. Through the above method, the user may recognize information on wearing feeling of clothes to be purchased.

According to another embodiment of the present disclosure, the measuring device 100 may measure bag internal space information. The processor 140 may determine the bag internal space information and modified bag internal space information. Based on the measurement result, the user may determine a size of a bag to be purchased and check a maximum accommodation space using elasticity information.

Figure 12:
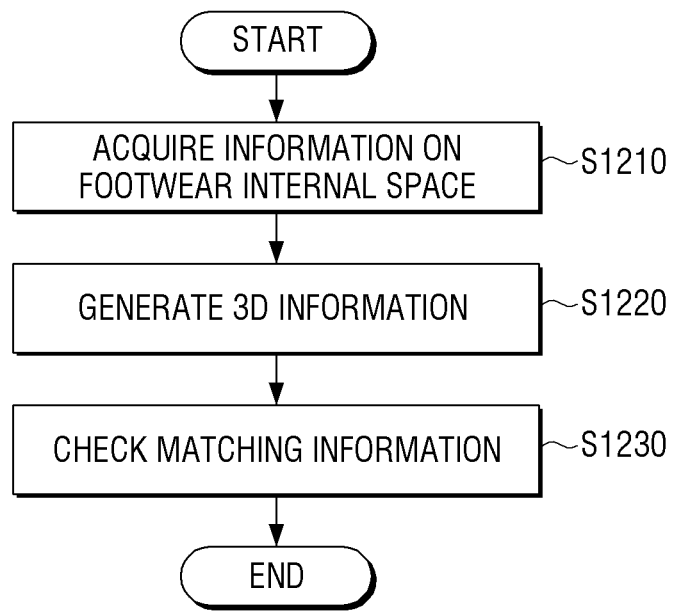
FIG. 12 is a flowchart of functions of a measuring device and an external electronic device according to an embodiment of the present disclosure.

FIG. 12 is a flowchart of functions of the measuring device and the external electronic device according to an embodiment of the present disclosure.

Referring to FIG. 12, the measuring device 100 may be inserted into footwear to acquire footwear internal space information at operation S1210. In this case, the footwear internal space information may be sensing data containing a moving distance of the fixer 110 and a specific point.

When the measuring device 100 transmits the footwear internal space information to the external electronic device 200, the processor 230 of the external electronic device 200 may process the received footwear internal space information to generate 3D information containing a plurality of specific points at operation S1220. In this case, the 3D information may further include information on a combination of a plurality of specific points as well as a plurality of specific points.

The processor 230 may compare the generated 3D information and pre-stored information on a user foot and provide matching information of footwear with respect to the user foot based on the comparison result at operation S1230. In this case, the pre-stored information on the user foot may be information received from the user equipment device 300.

Various embodiments of the present disclosure can include a computer readable medium including program commands for executing operations implemented through various computers. The computer readable medium can store program commands, data files, data structures or combinations thereof. The program commands recorded in the medium may be specially designed and configured for the present disclosure or be known to those skilled in the field of computer software. Examples of a computer readable recording medium include magnetic media such as hard discs, floppy discs and magnetic tapes, optical media such as compact disc-read only memory (CD-ROMs) and digital versatile disc (DVDs), magneto-optical media such as floptical discs, or hardware devices such as ROMs, RAMs and flash memories, which are specially configured to store and execute program commands. Examples of the program commands include a machine language code created by a compiler and a high-level language code executable by a computer using an interpreter and the like. The hardware device may be configured to operate as one or more software modules to perform an operation according to the present disclosure and, the converse may also be possible.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A measuring device for measuring a footwear internal space, the measuring device comprising:
    a main body configured to be inserted into footwear;
    a fixer configured to be moved in an outer direction from the main body using a motor and to fix the measuring device to the footwear when the main body is inserted into the footwear;
    a sensor configured to acquire sensing data for determining information on the footwear internal space when the measuring device is fixed to the footwear by the fixer;
    a transceiver configured to communicate with an external electronic device; and
    at least one processor configured to:
        control the motor to separate the fixer from the main body and to move the fixer in the outer direction from the main body in response to a space measurement start command,
        control the motor to stop movement of the fixer in response to a preset user command,
        identify the moving distance of the fixer to acquire data of the moving distance of the fixer, based on a movement amount of the motor,
        acquire the information on the footwear internal space and deformation information of the footwear internal space based on data of the moving distance of the fixer and the sensing data, and
        control the transceiver to transmit the information of the footwear internal space and the deformation information to the external electronic device.

2. The measuring device of claim 1, wherein the sensor comprises at least one of a proximity sensor, a laser sensor, or an infrared sensor.

3. A method of controlling an electronic device, the method comprising:
    acquiring information on a footwear internal space and deformation information of the footwear internal space from a measuring device inserted into footwear;
    generating three-dimensional (3D) information comprising a plurality of specific points based on the information on the footwear internal space and the deformation information; and
    comparing the 3D information with pre-stored information on a user foot and providing matching information of the footwear with respect to the user foot based on a result of the comparing,
    wherein the information on a footwear internal space and deformation information of the footwear internal space is acquired based on a data of a moving distance of the fixer included the measuring device, and
    wherein the data of a moving distance of the fixer is identify based on a movement amount of the motor included the fixer.

4. The method of claim 3, further comprising determining whether the footwear is right footwear or left footwear based on the 3D information.

5. The method of claim 3, wherein the generating of the 3D information comprises generating the 3D information using a line for connecting at least two points among the plurality of specific points.

6. The method of claim 5, further comprising transmitting a matching result of the footwear with respect to the user foot to a user equipment device.

7. The method of claim 6, wherein the transmitting of the matching result comprises transmitting recommendation information for footwear matched with the user foot when the footwear is not matched with the user foot.

8. A non-transitory computer readable recording medium having recorded thereon a program for executing a control method of an electronic device, the method comprising:
    acquiring information on a footwear internal space and deformation information of the footwear internal space from a measuring device inserted into the footwear;
    generating three-dimensional (3D) information comprising a plurality of specific points based on the information on the footwear internal space and the deformation information; and
    comparing the 3D information with pre-stored information on a user foot and providing matching information of the footwear with respect to the user foot based on a result of the comparing, wherein the information on a footwear internal space and deformation information of the footwear internal space is acquired based on a data of a moving distance of the fixer included the measuring device, and wherein the data of a moving distance of the fixer is identify based on a movement amount of the motor included the fixer.

9. The computer readable recording medium of claim 8, further comprising determining whether the footwear is right footwear or left footwear based on the 3D information.

10. The computer readable recording medium of claim 8, wherein the generating of the 3D information comprises generating the 3D information using a line for connecting at least two points among the plurality of specific points.

11. The computer readable recording medium of claim 10, further comprising transmitting a matching result of the footwear with respect to the user foot to a user equipment device.

12. The computer readable recording medium of claim 11, wherein the matching result comprises recommendation information for footwear matched with the user foot when the footwear is not matched with the user foot.

* * * * *